No. 609,840. Patented Aug. 30, 1898.
W. SHOPE.
TIRE TIGHTENER.
(Application filed Feb. 21, 1898.)
(No Model.)
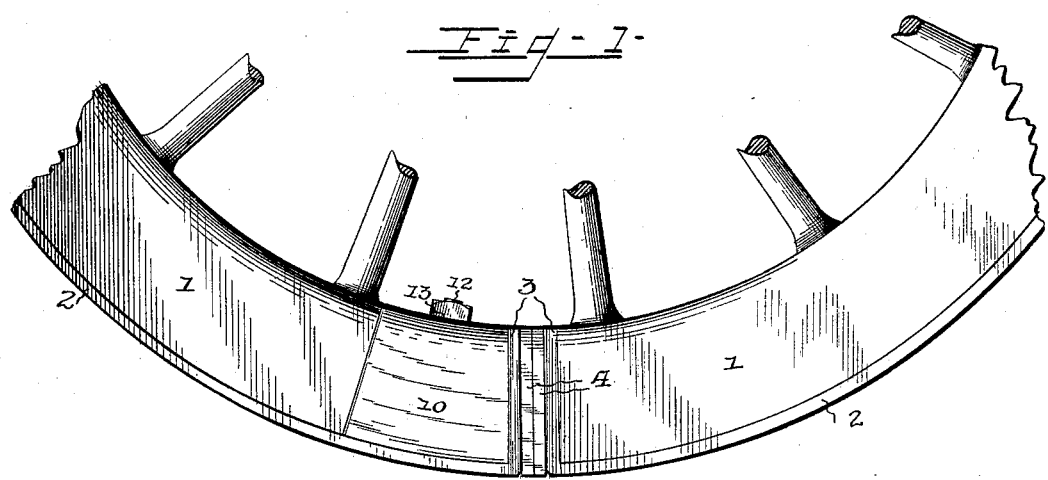
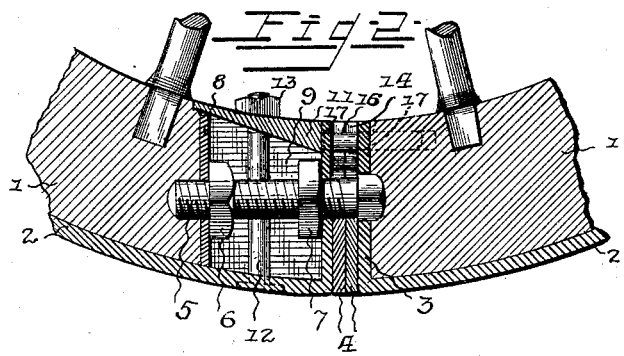
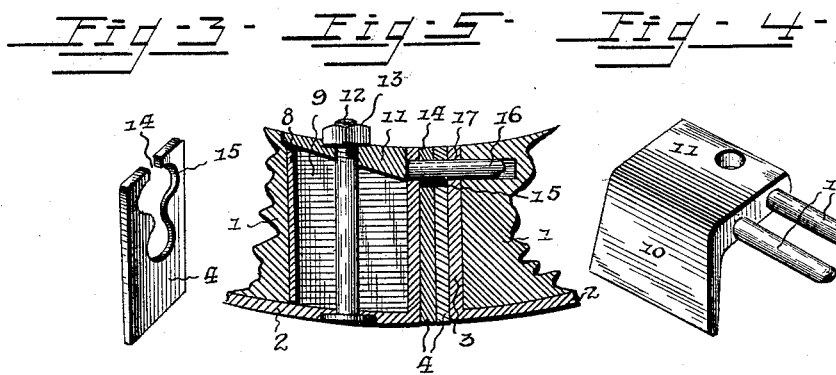
Witnesses:—
O. J. Young.
William Shope, Inventor.
By his Attorneys,
C. A. Snow & Co.

UNITED STATES PATENT OFFICE.

WILLIAM SHOPE, OF WOOD HILL, MISSOURI.

TIRE-TIGHTENER.

SPECIFICATION forming part of Letters Patent No. 609,840, dated August 30, 1898.

Application filed February 21, 1898. Serial No. 671,129. (No model.)

*To all whom it may concern:*

Be it known that I, WILLIAM SHOPE, a citizen of the United States, residing at Wood Hill, in the county of Dallas and State of Missouri, have invented a new and useful Tire-Tightener, of which the following is a specification.

My invention relates to tire and felly tighteners, and has for its object to provide a simple, compact, and efficient device adapted to be arranged at a tire-joint for either expanding the felly or contracting the tire or accomplishing both simultaneously in order to secure the desired relative adjustment of the parts.

Further objects and advantages of this invention will appear in the following description, and the novel features thereof will be particularly pointed out in the appended claims.

In the drawings, Figure 1 is a side view of a portion of a wheel, showing a tightener embodying my invention applied in the operative position thereto. Fig. 2 is a sectional view of the same, taken in a plane parallel with the side surface of the wheel. Fig. 3 is a detail view in perspective of one of the wedge-plates detached. Fig. 4 is a similar view of the cap-plate detached. Fig. 5 is a detail vertical section in the plane of the cap-securing bolt.

Similar numerals of reference indicate corresponding parts in all the figures of the drawings.

1 designates a felly of the split type, with its contiguous extremities separated, and 2 a tire, of which the extremities are downturned in radial or approximately parallel planes to form wedge-seats 3, between which may be fitted one or more wedges 4 (shown in detail in Fig. 3) for filling the interval formed by the spaced surfaces of the seats, and thus completing the peripheral contour of the wheel, the outer edges of said wedges being flush with the exterior surface of the tire.

Arranged longitudinally of the rim, with its extremities seated in sockets formed, respectively, in the spaced extremities of the felly, is a tightening-bolt 5, upon which are threaded felly and tire bearing-nuts 6 and 7, the former being arranged to bear against a wear-plate 8 in contact with the contiguous extremity of the felly, and the latter bearing against the inner surface of the contiguous inturned extremity of the tire. It will be seen that by tightening or loosening the felly bearing-nut the expansion or contraction of the felly may be controlled with relation to the tire, whereas the adjustment of the tire bearing-nut 7 is adapted to vary the tension of the tire, and it is obvious that by the proper relative adjustments of the two nuts the desired uniform contact of the felly and tire throughout the circumference of the wheel without overstrain may be secured.

To close one side of the space or opening formed between one downturned extremity of the tire and the contiguous extremity of the felly, I provide the tire with an inwardly-extending side ear 9, and the opposite side of said space or opening is closed by a cap-plate 10, having an inner leaf 11, by which the inner side of this opening is closed, said cap-plate being held in place by means of a securing-bolt 12, extending through alined openings in the tire and the inner leaf of the cap-plate and fitted in contact with the latter with a nut 13.

As the tightening-bolt extends across the space between the inturned extremities of the tire, the wedges are provided with central slots 14 to pass thereover, and in order that outward displacement of the wedges may be prevented I provide them, near their inner ends, with seats 15 for engagement by tongues 16, carried by the cap-plate and extending through alined openings 17 in the inturned extremities of the tire. Therefore when a tire or felly needs adjustment the cap-plate should be removed, and the proper manipulation of the nuts will relieve an overstrain or take up looseness of either of the parts, whereupon one or more wedges should be introduced between the separated extremities of the tire, the cap-plate applied with its tongues extending through the alined openings of the wedge-seats and also through the openings of the wedges to prevent outward displacement of the latter, and finally the securing-bolt should be applied to maintain the cap-plate in its operative position, and thus conceal the adjusting devices. When the cap-plate is applied, the exterior appearance of the wheel is unbroken, and the outer edges of the wedges completely fill the space between the inturned extremities of the tire, and thus complete the periphery of the wheel.

Various changes in the form, proportion, and the minor details of construction may be resorted to without departing from the spirit or sacrificing any of the advantages of this invention.

Having described my invention, what I claim is—

1. A wheel having a split felly, and a split tire having inturned extremities forming wedge-seats, a tightener having a longitudinally-disposed bolt, felly and tire bearing-nuts threaded upon said bolt, and bearing respectively upon the separated extremities of the felly and tire, a wedge removably fitted between said wedge-seats, and a removably-secured cap-plate closing the interval between the spaced extremities of the tire and felly, and engaged with said wedge to lock it against accidental displacement, substantially as specified.

2. A wheel having a split felly and a split tire having inturned extremities spaced apart to form wedge-seats, and adjusting devices having a bolt, and felly and tire bearing-nuts threaded upon the bolt, a wedge removably seated between the inturned extremities of the tire, a cap-plate for closing the interval between the spaced extremities of the tire and felly, and having tongues for engaging said wedge, and means for securing the cap-plate in place, substantially as specified.

3. A wheel having a split felly and a split tire having inturned extremities, one of which bears against the contiguous extremity of the felly, and the other of which is spaced from the other extremity of the felly, an adjusting device having a bolt, and felly and tire bearing-nuts threaded upon the bolt, and bearing respectively upon the spaced extremities of the felly and tire, a wedge seated between the inturned extremities of the tire, a cap-plate for closing the open sides of the space between the separated extremities of the felly and tire, said cap-plate having tongues engaged with openings in the wedge to maintain the latter in place with its outer edge flush with the exterior surface of the tire, and a securing-bolt for holding the cap-plate in its operative position, substantially as specified.

In testimony that I claim the foregoing as my own I have hereto affixed my signature in the presence of two witnesses.

WILLIAM SHOPE.

Witnesses:
  M. D. JOHNSON,
  JOSEPH NICHOLSON.